(12) United States Patent
Prasser (10) Patent No.: US 8,728,189 B2
(45) Date of Patent: May 20, 2014

(54) SYSTEMS AND METHODS FOR HEAT RECOVERY

(75) Inventor: Robert H. Prasser, Lakewood, WI (US)

(73) Assignee: Thermo Recovery Filters, Inc., Lakewood, WI (US)

(*) Notice: Subject to any disclaimer, the term of this patent is extended or adjusted under 35 U.S.C. 154(b) by 913 days.

(21) Appl. No.: 12/807,653

(22) Filed: Sep. 10, 2010

(65) Prior Publication Data

US 2012/0060818 A1    Mar. 15, 2012

(51) Int. Cl.
    *B01D 50/00*     (2006.01)

(52) U.S. Cl.
    USPC ........ 55/434.2; 55/444; 55/DIG. 36; 165/158

(58) Field of Classification Search
    USPC ........... 55/434.2, 440, 444, DIG. 36; 165/158
    See application file for complete search history.

(56) References Cited

U.S. PATENT DOCUMENTS

| | | | |
|---|---|---|---|
| 3,260,189 A | | 7/1966 | Jensen |
| 3,698,378 A | | 10/1972 | Rosenberg et al. |
| 3,827,343 A | | 8/1974 | Darm |
| 3,945,812 A | * | 3/1976 | Doane ............................. 95/272 |
| 4,050,368 A | | 9/1977 | Eakes |
| 4,084,745 A | | 4/1978 | Jones |
| 4,122,834 A | | 10/1978 | Jacobs |
| 4,175,614 A | | 11/1979 | Huggins |
| 4,197,907 A | * | 4/1980 | Smith ............................. 165/76 |
| 4,235,220 A | | 11/1980 | Hepner |
| 4,350,504 A | | 9/1982 | Diachuk |
| 4,437,867 A | | 3/1984 | Lerner |
| 4,769,149 A | | 9/1988 | Nobilet et al. |
| 5,456,244 A | | 10/1995 | Prasser |
| 5,524,607 A | | 6/1996 | Grohman et al. |
| 5,540,744 A | | 7/1996 | Renna |
| 5,558,080 A | | 9/1996 | Grohman et al. |
| 5,687,707 A | | 11/1997 | Prasser |
| 6,344,074 B1 | | 2/2002 | Ward et al. |

FOREIGN PATENT DOCUMENTS

| | | |
|---|---|---|
| BE | 829965 | 10/1975 |
| BE | 899292 | 7/1984 |
| EP | 0036659 A1 | 9/1981 |
| EP | 021809 | 10/1984 |
| FR | 2443033 | 8/1980 |
| FR | 2482703 | 11/1981 |
| SU | 522377 | 9/1976 |

OTHER PUBLICATIONS

International Search Report and Written Opinion dated Jan. 25, 2012 in International Patent Application Serial No. PCT/US11/50971.

(Continued)

*Primary Examiner* — Robert A Hopkins
(74) *Attorney, Agent, or Firm* — Sheridan Ross P.C.

(57) ABSTRACT

An embodiment of filter unit heat exchanger according to the present invention provides improved operability and manufacturability. Such device may include a housing substantially surrounding a heat exchange assembly. Provided through the housing are one or more tortuous fluid flow paths used to direct airflow therethrough around portions of the heat exchange assembly for efficient operation. The tortuous path(s) may be provided by one or more nozzle apertures on an input side of the housing and one or more diffuser apertures on an output side of the housing, where the nozzle apertures and diffuser apertures are offset to cause desired airflow deflection. The filter unit may include desired symmetries so as to improve manufacturability and/or installation.

18 Claims, 7 Drawing Sheets

(56) References Cited

OTHER PUBLICATIONS

1991 Sweet's Catalog Identifying a "Range Guard" Grease Filter.
U.S. Patent No. 5,687,707; Petition to Revive dated Oct. 24, 1996 (2 pages), Decision on Petition dated Nov. 19, 1996 (2 pages), First Preliminary Amendment dated Apr. 24, 1997 (1 page), Notice of Allowability dated Jun. 22, 1997 (3 pages), Notice of Allowability—Issue fees due dated Jun. 25, 1997 (4 pages).

U.S. Patent No. 5,456,244; Office Action dated Oct. 11, 1994 (5 pages), Reply and Amendment dated Feb. 10, 1995 (14 pages), Notice of Allowabiity dated Mar. 22, 1995 (4 pages), Submission of Formal Drawings dated Jun. 12, 1995 (4 pages), Report on the Filing or Determination of an Action Regarding a Patent dated Jul. 31, 1997 (4 pages).

* cited by examiner

SYSTEMS AND METHODS FOR HEAT RECOVERY

BACKGROUND OF INVENTION

The present invention relates generally to air filters and more particularly to an improved grease trap air filter to be used as a heat transfer mechanism. The present invention relates to a combined system which simultaneously filters grease and particulate from hot fumes and transfers heat to a fluid circulating inside the system. The heated fluid may then be used to supply heat for other purposes, such as heating water or air.

During the operation of commercial or institutional kitchens, a significant amount of valuable heat energy is lost as a result of hot fumes and/or air being vented to the atmosphere. These hot fumes are generated from cook stoves, hot plates, deep fat fryers, and other cooking apparatus. As a result of such extreme heat and variety of particulates generated during cooking, it is necessary for the comfort and health of kitchen workers to exhaust these fumes, usually on a continuous basis, through flue chimneys or similar venting devices. This process effectively replaces the hot kitchen air with cooler, clean outside air. Although this circulation process is necessary to provide a constant source of clean air to the kitchen environment, this venting practice is both inefficient and uneconomical, especially in colder climates where the cost to heat internal air and water is significant.

A further problem encountered in commercial kitchens is the filtering of grease and other particulates entrained in the hot fumes generated during the cooking of foods. If improperly filtered, this grease can cause fouling and the eventual malfunction of air ventilation systems, as well as create fire hazards if allowed to accumulate. Accordingly, hot fume air filters, which are normally located in fume hoods over cooking surfaces, are generally required to be cleaned daily, or at a minimum of 2-3 times a week. This tedious cleaning process is both time consuming and expensive.

The use of heat exchangers to capture thermal energy above cooking surfaces has been known for years. These designs, however, position the heat exchangers substantially downstream of existing grease filters. This approach is unfavorable for at least three reasons. First, these designs are inefficient since the heat exchanger is located downstream of the grease filter and a significant distance from the heat source. Thus, valuable thermal energy is lost by absorption into the grease filter and through general dissipation prior to the heat reaching the exchanger. Second, the grease filters currently being used upstream of the heat exchangers significantly impede air flow, especially when congested with grease, hence reducing the efficiency of the air ventilation system and heat transfer efficiency. Third, when the heat source is turned off, the grease quickly solidifies on the prior filters, which usually include heat exchange fins, and requires cleaning for both safety and efficiency. Finally, despite the existence of these kinds of heat exchangers generally, many existing kitchens fail to incorporate any kind of heat exchanger due to integration costs. Retrofitting existing kitchen equipment with heat exchanger systems may require an entirely new flue hood assembly and substantial piping and accessories. This conversion is both time consuming and expensive. While some improvements have been made to combine a filter and heat exchanger, such as in U.S. Pat. No. 5,456,244, there remains room for improvement in the art. For instance, there is room for a filter unit having simplified construction, using less material and providing more complete heat transfer than prior devices.

SUMMARY OF INVENTION

Embodiments of the present invention include systems and methods related to filter units having simplified construction, using less material and providing more complete heat transfer than prior devices.

An embodiment of a filter unit according to the present invention comprises a housing including a cavity, and a heat exchanger disposed substantially within the cavity. Through the housing is provided at least one entrance aperture provided on an upstream side of the heat exchanger. On the downstream side of the heat exchanger, opposite the upstream side, at least one baffle is provided on the housing. Also on the downstream side of the heat exchanger, at least one exit aperture is provided through the housing. The at least one baffle is aligned with the at least one entrance aperture, such that when a gas is drawn through the at least one entrance aperture and across the heat exchanger, the baffle redirects the gas towards the heat exchanger prior to the gas leaving the cavity through the at least one exit aperture.

According to one aspect of a filter unit according to the present invention, the housing comprises a base and a cover. The base may include a substantially planar base wall having a base wall perimeter and a plurality of lateral sidewalls coupled to the base wall perimeter substantially encircling the base cavity. The at least one entrance aperture may be formed through the base wall. The base wall perimeter may be substantially rectilinear.

According to another aspect of a filter unit according to the present invention, the base may further include at least one fin member extending at least partially across one of the at least one entrance aperture into the cavity at an oblique angle relative to the base wall. The base may include a pair of fin members extending partially across each entrance aperture into the cavity at an oblique angle relative to the base wall.

According to yet another aspect of a filter unit according to the present invention, the cover may include a substantially planar cover plate having a cover plate perimeter and at least one lateral cover sidewall coupled to and extending at an oblique angle from the cover plate, the at least one lateral cover sidewall adapted to extend into the housing cavity, where the at least one exit aperture is formed through the cover plate.

According to still another aspect of a filter unit according to the present invention, wherein the heat exchanger may include a first header pipe extending between a first end and a second end and a second header pipe spaced from the first header pipe, the second header pipe extending between a third end and a fourth end. At least one of the first and second ends and/or at least one of the third and fourth ends may be closed. At least one fluid flow conduit may be disposed between and in fluid communication with the first header pipe and the second header pipe, wherein the header pipes and at least one fluid flow conduit define a fluid cavity. A first fluid port may be provided on the first header pipe in fluid communication with the fluid cavity, and a second fluid port may be provided on the second header pipe in fluid communication with the fluid cavity.

According to a further aspect of a filter unit according to the present invention, the first and second header pipes may be substantially longitudinally straight pipes disposed at least substantially parallel to each other.

According to a still further aspect of a filter unit according to the present invention, a plurality of fluid flow conduits may be provided at least substantially parallel to each other and at least substantially orthogonal to the header pipes.

According to another aspect of a filter unit according to the present invention, a heat exchanger may include a heat-conductive material at least partially coated with a reduced friction material, such as polytetrafluoroethylene.

A system according to the present invention includes a cooking surface including a heat source and an exhaust system adapted to draw in gasses that are disposed above the cooking surface, the exhaust system providing a gas flow path for the gasses. Disposed in the gas flow path is a filter unit that includes a housing including a cavity and a first heat exchanger disposed substantially within the cavity, the first heat exchanger including a fluid input port and a fluid output port. At least one entrance aperture may be provided through the housing on an upstream side of the first heat exchanger, and at least one baffle may be provided on the housing on a downstream side of the first heat exchanger, the downstream side being oppositely disposed of the upstream side. Through the housing, on the downstream side of the first heat exchanger, at least one exit aperture is provided. The at least one baffle is aligned with the at least one entrance aperture, such that when the gasses are drawn through the at least one entrance aperture and across the first heat exchanger, the baffle redirects the gasses towards the first heat exchanger prior to the gasses leaving the cavity through the at least one exit aperture. The system further includes fluid supply coupled to the input port and a drain line coupled at a drain upstream end to the output port and at a drain downstream end to one or more of a storage tank and a second heat exchanger.

According to another aspect of a system according to the present invention, the second heat exchanger is selected from the group consisting of: a radiator adapted to heat an indoor space, a length of heat-conductive tubing disposed in or below a walking surface, and a length of heat-conductive tubing disposed on a roof of a building.

According to yet another aspect of a system according to the present invention, the drain line is coupled to the second heat exchanger and a third heat exchanger. Each of the second heat exchanger and the third heat exchanger may be selected from the group consisting of: a radiator adapted to heat an indoor space, a length of heat-conductive tubing disposed in or below a walking surface, and a length of heat-conductive tubing disposed on a roof of a building.

According to a further aspect of a system according to the present invention, the cooking surface may be disposed substantially parallel to horizontal level, the filter unit further comprising a substantially planar base wall arranged at an oblique angle relative to the cooking surface. The angle is preferably from about 10 degrees to about 60 degrees, and more preferably about 12 degrees to about 45 degrees.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
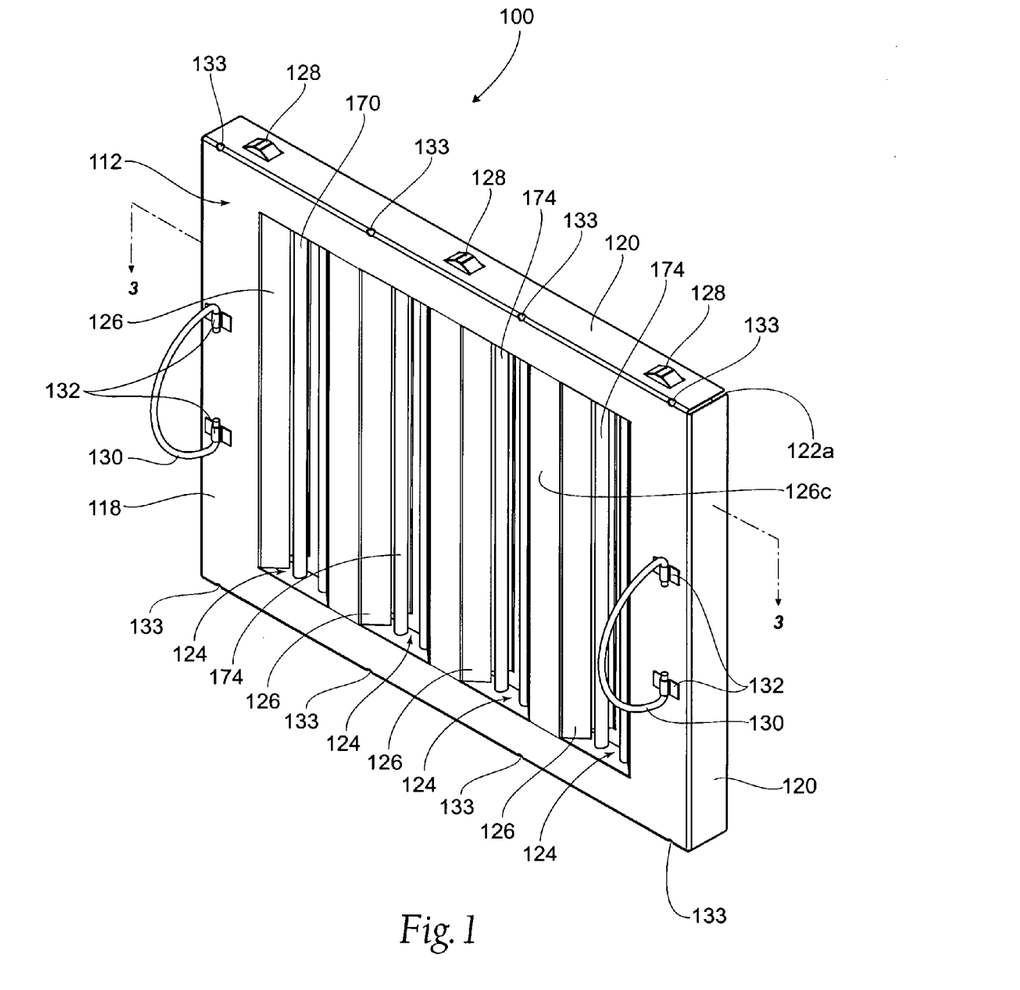
FIG. 1 is a perspective view of an embodiment of a filter unit according to the present invention.
Figure 2:
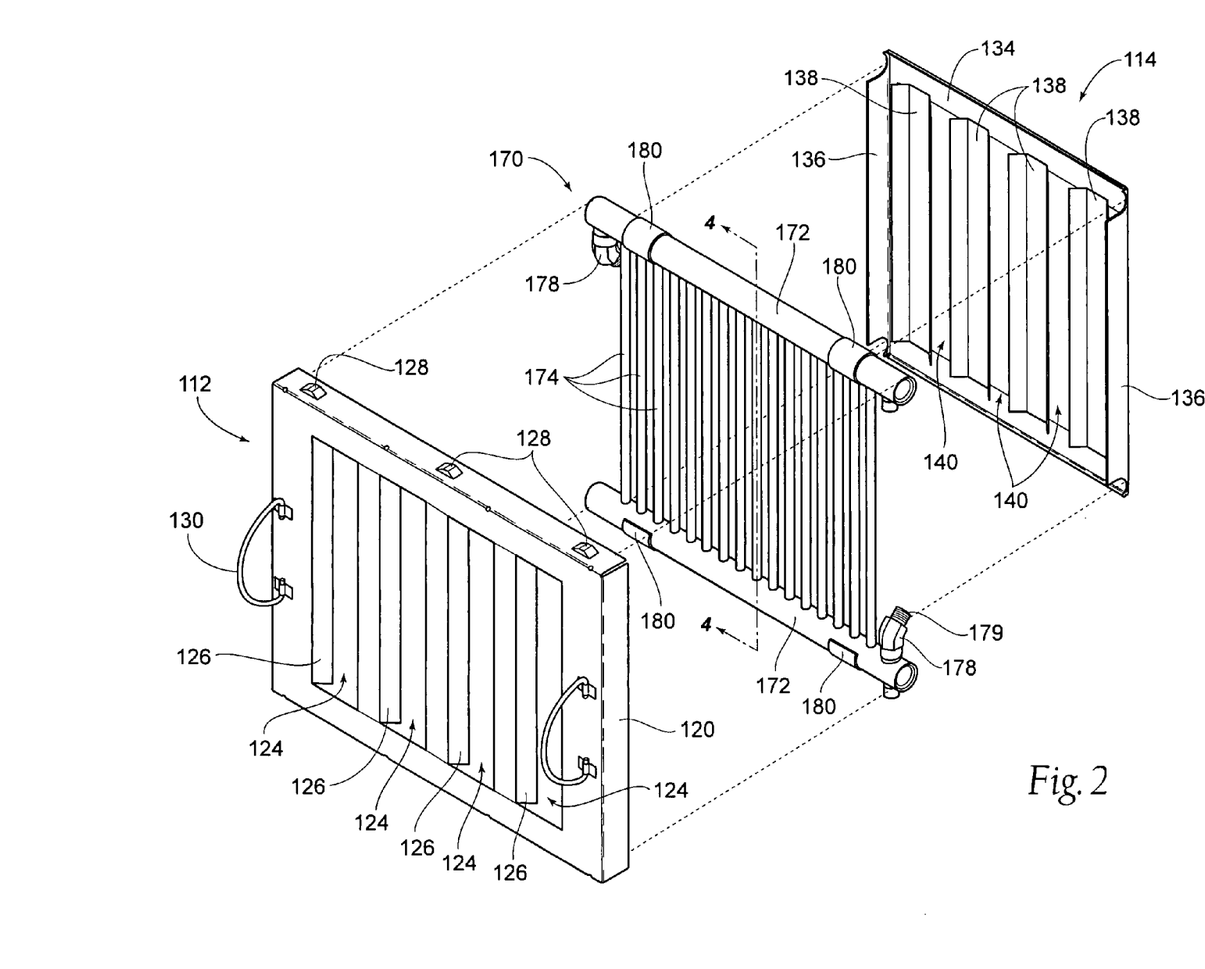
FIG. 2 is a partial assembly view of the embodiment of FIG. 1.

Turning now to the figures, FIG. 1 depicts an embodiment 100 of a filter unit, or cartridge, according to the present invention. The filter unit 100 comprises a housing 110 and a heat exchanger 170. The housing 110 generally surrounds the heat exchanger 170 and may be comprised of one or more pieces. The preferred housing is preferably two pieces including a base 112 and a cover 114. The base 112 may be formed in a configuration that is substantially a parallelepiped with an open top 116. If formed as such, the base 112 includes a base wall 118 and a plurality of lateral sidewalls 120. The base 112 may be formed from a cruciform shape that is stamped or otherwise formed out of a generally planar sheet material, such as sheet stainless steel of a desired thickness. Once stamped, the lateral sidewalls 120 may be bent towards each other, thus forming a base cavity 122. Alternatively, the sidewalls 120 may be coupled to the base wall 118, such as by welding. There may be a gap 122a between adjacent sidewalls 120 or the gap 122a may be closed with a sealant or welded. Additionally or alternatively, the plurality of sidewalls 120 may be formed as a unitary member, such as in a ring formation, and coupled to the base wall 118.

The base wall 118 is preferably perforate, including one or more air portals 124 formed therethrough, to allow air to pass into the base cavity 122 through the base wall 118. Various shapes of the base wall 118 are contemplated, although a generally planar, rectilinear shape is preferred for ease of manufacture and installation. In addition, such shape is easily adaptable to be utilized with filter assembly units, or exhaust hoods, that are presently provided in commercial cooking settings. Furthermore, it is preferred that the shape of the filter unit 100 be at least laterally symmetrical, such that the unit may be inserted into a given hood or exhaust assembly in a plurality of orientations, so as to provide ease of connectivity. Indeed, the filter unit is preferably rotationally symmetrical in at least one plane.

Figures 5, 6:
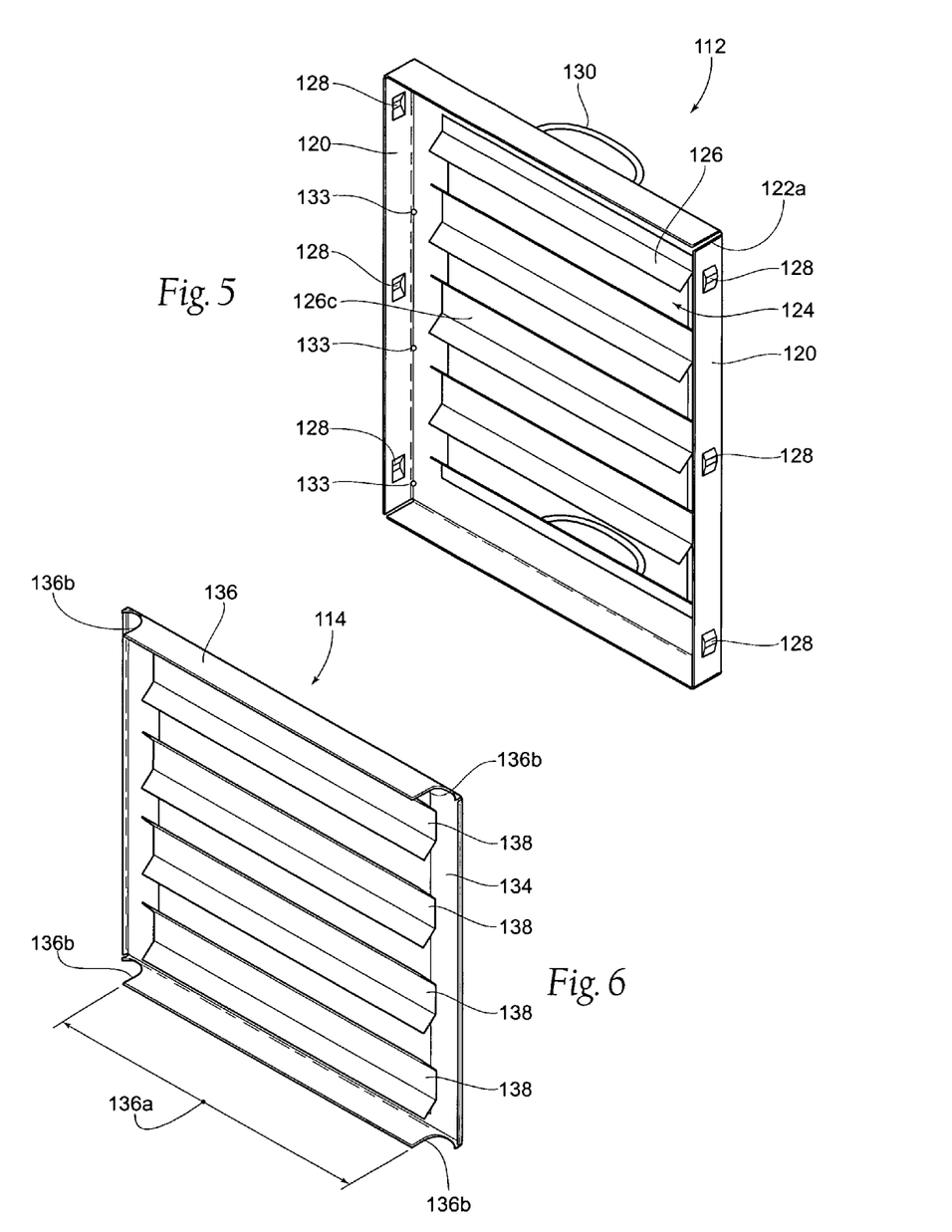
FIG. 5 is a perspective view of an embodiment of a bottom filter housing included in the embodiment of FIG. 1.
FIG. 6 is a perspective view of an embodiment of a top filter housing included in the embodiment of FIG. 1.

The openings 124 formed in the base wall 118 of the base 112 preferably perform at least a slight nozzling function on air entering the housing 110. This may be accomplished by an arrangement of pairs of fins 126 adapted to extend from the openings 124 towards each other. In other words, a pair of fins 126a, 126b may be provided for each aperture 124, wherein each fin 126 extend into the base cavity 122 and toward the associated fin 126 in the respective pair. Thus, each opening is preferably wider at its upstream side 124a and narrower at its downstream side 124b. The fins 126 may be formed from the same material as the base wall 118, and indeed may be stamped and formed from the same piece of material as the base wall 118, and then bent into the base cavity 122. Additionally or alternatively, the fins 126 may be provided as separate components that are preferably stationarily coupled with respect to the base wall 118. If provided as separate components, two fins 126 may be provided as coupled together, perhaps as a unitary member including a fin plate 126c disposed between the two fins 126. The fin plate 126c may be include a substantially planar surface extending along a length, proximate end portions of which are secured to the base wall 118. The preferred nozzling function provided by the arranged fins 126 focuses the airflow towards a baffle 138 that is included on the cover 114, or that is at least disposed on the opposite side of the heat exchanger 170 from the fins 126, and therefore assist in the collection of grease particles. Also as later discussed, the direction of airflow creates a turbulent airflow to increase exposure time of the air with the heat exchanger 170. Accordingly, it is preferred that no direct airflow path is created through the filter assembly 110, or a majority of the airflow therethrough is not direct. Rather, one or more tortuous airflow paths 201 are created thereby allowing for a turbulent flow that exposes the heated air to the heat exchanger 170 for a sufficient amount of time to allow for adequate heat exchange to a fluid contained therein.

Also on the base 112, one or more retainer tabs 128 are preferably formed on at least one of the lateral side members 120, preferably on two opposing lateral side members 120. A preferred retainer tab 128 is a punched extrusion from the lateral side member 120 so as to form a spring type retention force. Also provided on the base 112 is at least one and preferably a plurality of handles 130, which may be formed in a variety of ways. Preferably, the handles 130 are provided in opposing positions on the assembly 100 to allow for balanced insertion and removal of the filter unit 100. The preferred handles 130 are full or partial wire loop handles that are suspended from handle brackets 132 that may be formed integrally with or coupled to the base wall 118.

In addition to acting as a heat exchanger, a filter unit 100 according to the present invention may serve as an air filter which assists in the collection of grease particles, which is especially advantageous to be used over commercial cooking surfaces. To aid in the drainage of collected grease particles, the base 112 may be provided with one or more drain holes 133 formed therethrough. A plurality of drain holes 133 is preferred, and they may be formed along the juncture of one or more of the lateral side members 120 and the base wall 118.

The cover 114 preferably generally comprises a plate 134, and may further include one or more lateral side members 136 extending from the plate 134. The side members 136 may be provided in a length 136a that allows insertion of the side members 136 between header pipes 172 of the heat exchanger 170. Furthermore, the side members 136 may be formed with one or more heat exchanger interfaces 136b, which may contact and/or surround a portion of the heat exchanger 170 to maintain position during and after installation. The cover 114 may be formed as a symmetrical shape that may be inserted into the base 112 in a plurality of orientations. Formed integrally with or coupled to the plate 134 are one or more baffles 138 that are disposed opposite the apertures 126 formed in the base 112 so as to assist in creating the tortuous air flow path through the filter unit 100. The baffles 138 are preferably arranged to act as a one or more diffusers, such that the upstream side 140a of openings 140 disposed between the baffles 138 is smaller than the downstream side 140b. The baffles 138 may be formed similar or identical to the unitary fin members, discussed above. It is thought that the nozzle effect provided by the base 112 and the diffuser effect on the cover 114 actually assist in the creation of the tortuous airflow path 150 to aid in the collection of grease and to maximize or assist in the heat transfer to fluid in the heat exchanger 170.

The filter base 112 and cover 114 assemblies are preferably formed from stainless steel, though other materials are certainly contemplated, such as aluminum, copper, steel and others. A plastic housing could also be used, but is not generally preferred due to a desirability of durability in cleaning and repair. Further, plastic has demonstrated affections for grease, which may be caused by its insulative properties, and therefore it may require more frequent cleaning.

Figure 4:
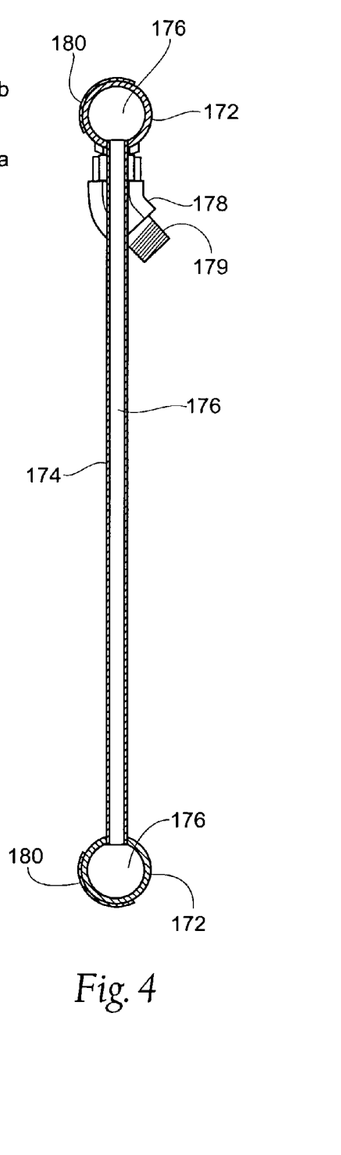
FIG. 4 is a side elevation view of an embodiment of a heat exchanger included in the embodiment of FIG. 1.

The heat exchanger 170 is preferably formed from two header pipes 172, which may be provided in a parallel arrangement, and a plurality of fluid flow conduits 174, which also may be provided in a parallel arrangement, extending between the two header pipes 172. The heat exchanger 170 is preferably sized so as to be positioned substantially within the base cavity 122. Such arrangement provides a fluid flow chamber 176 within the header pipes 172 and conduits 174, through which a preferred fluid may be caused to flow. A preferred fluid may be a potable fluid, such as water or propylene glycol. Alternatively, a serpentine fluid flow chamber arrangement could be used. However, in the provided embodiment, less structural material may be required due to increased air exposure time to the heat exchanger 170 caused by the tortuous airflow paths. While the heat exchanger 170 could be formed asymmetrically, it is preferably at least rotationally symmetrical in at least one plane, such that it may be inserted into the base cavity 122 in a plurality of orientations. In a preferred embodiment, each header 172 is provided with a fluid port 178 in fluid communication with the fluid flow chamber 176. The ports 178 may be provided with threads 179 or other coupling mechanism, such as a standard fluid quick connect coupling, to be connected to a fluid supply or drain. Preferably, as shown, the ports 178 are provided on opposite ends of their respective header 172. Vibration pads 180 may be provided on one or more components of the filter unit 100. Preferably, a plurality of pads 180 is adhered to each header pipe 172 in the heat exchanger 170. The vibration pads 180 are adapted to cooperate with the base wall 118 to prevent a rattling of two or more of the components.

A preferred material for one or more, and preferably a majority, of the components of the heat exchanger is copper, which may be coated with a non-stick material, such as a paint including polytetrafluoroethylene, available as a Teflon® material, available from E.I. du Pont de Nemours and Company of Wilmington, Del. The non-stick material may be painted onto the desired heat exchanger components. Another acceptable material for the heat exchanger headers 172 and conduits 174 is steel tube, which may also be painted with a non-stick material.

Figure 3:
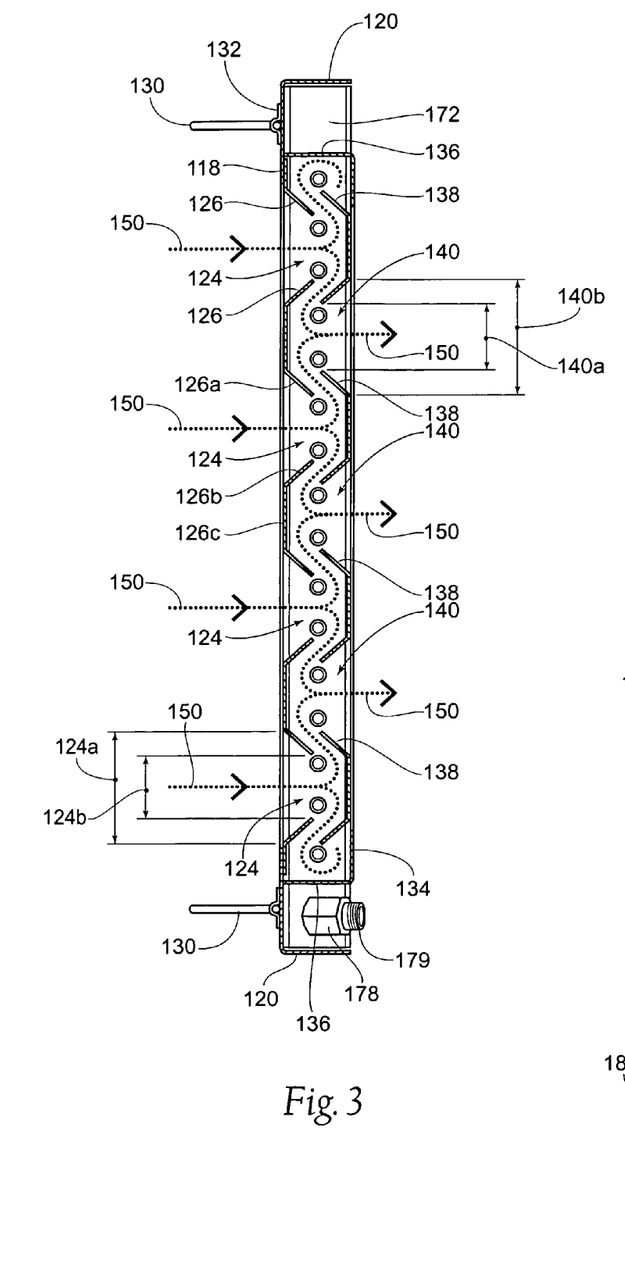
FIG. 3 cross-sectional view taken along line 3-3 of FIG. 1.

In use, a filter unit 100 according to the present invention is inserted into a filter housing or holding unit above a cooking surface. As can be seen in the cross section of FIG. 3, the combination of the fins 126 and baffles 138 create tortuous, or non-sightline fluid flow paths 150 for exhaust air to enter through the base wall 118 and exit through the cover plate 134. The air paths 150 are directed around the fluid flow conduits 174 included in the heat exchanger 170. Accordingly, a majority of the conduits 174 are exposed directly to heated air flow, and not just a portion thereof. Such exposure combined with the turbulent nature of the airflow mechanism helps with the efficiency of the device.

Figure 7A:
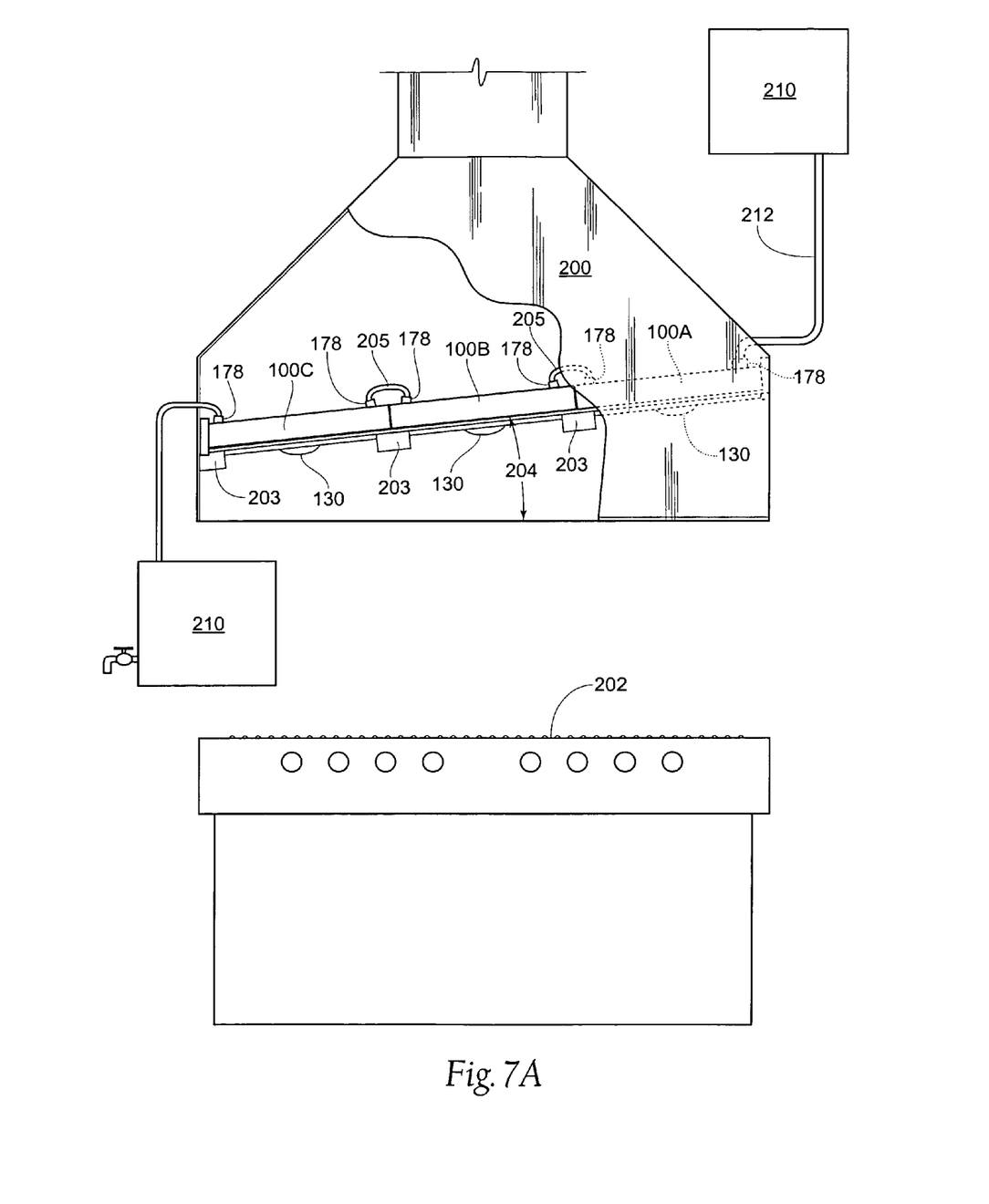
FIG. 7A is a partial cutaway view of a first embodiment of an open system utilizing an embodiment of a filter unit according to the present invention.

Generally, systems and methods according to the present invention may be used to collect heat generated by a cooking surface, which would otherwise be wasted as exhaust, and transfer such heat to other locations for use in an open or closed circulation system. As can be seen in FIG. 7A, one or more filter units 100 may be installed in an exhaust housing 200, preferably above a cooking surface 202. While the filter 100 could be installed at any desirable angle, such as parallel to horizontal level, it is preferably installed at an angle 204 relative to horizontal level, the angle 204 being disposed at between about 12 degrees and about 45 degrees for most efficient drainage of collected oil particles, thus disposing the longitudinal dimension of the fins 124 and baffles 138 at approximately such angle.

Collected oil may drain out of the provided drain holes 133 and into one or more grease traps 203. As further shown in FIG. 7, a plurality of filter units 100 may be coupled together to form an expanded filter unit. The units 100 may be coupled in series, as shown, or in parallel. If coupled in series, a coupler 205 may be connected at one end to a drain port 178 of one filter unit 100A and at the other end to a supply port 178 of a subsequent filter unit 100B, and so on. If coupled in parallel, a supply port 178 on each unit 100 is coupled to a fluid supply line and a drain port 178 on each unit 100 can be coupled to a drain line.

A system utilizing the filter unit(s) 100 of the present invention may be an open system, such as when the heated fluid is removed from the system and put to some other use, such as dishwashing, or it is stored for future use. FIG. 7A depicts an open system. Water or other desirable fluid may be provided by gravity pressure, such as from an elevated supply tank 210 or municipal water supply, or it may be pumped to the system. Conduit 212 and standard connections may be used to couple the water supply to a first filter unit 100A. The fluid is allowed to flow through one or more filter units 100, and then drain into a storage tank 214 for future use, such as being pumped to a dishwasher, hot water supply in a restroom, or used for other purposes.

Figure 7B:
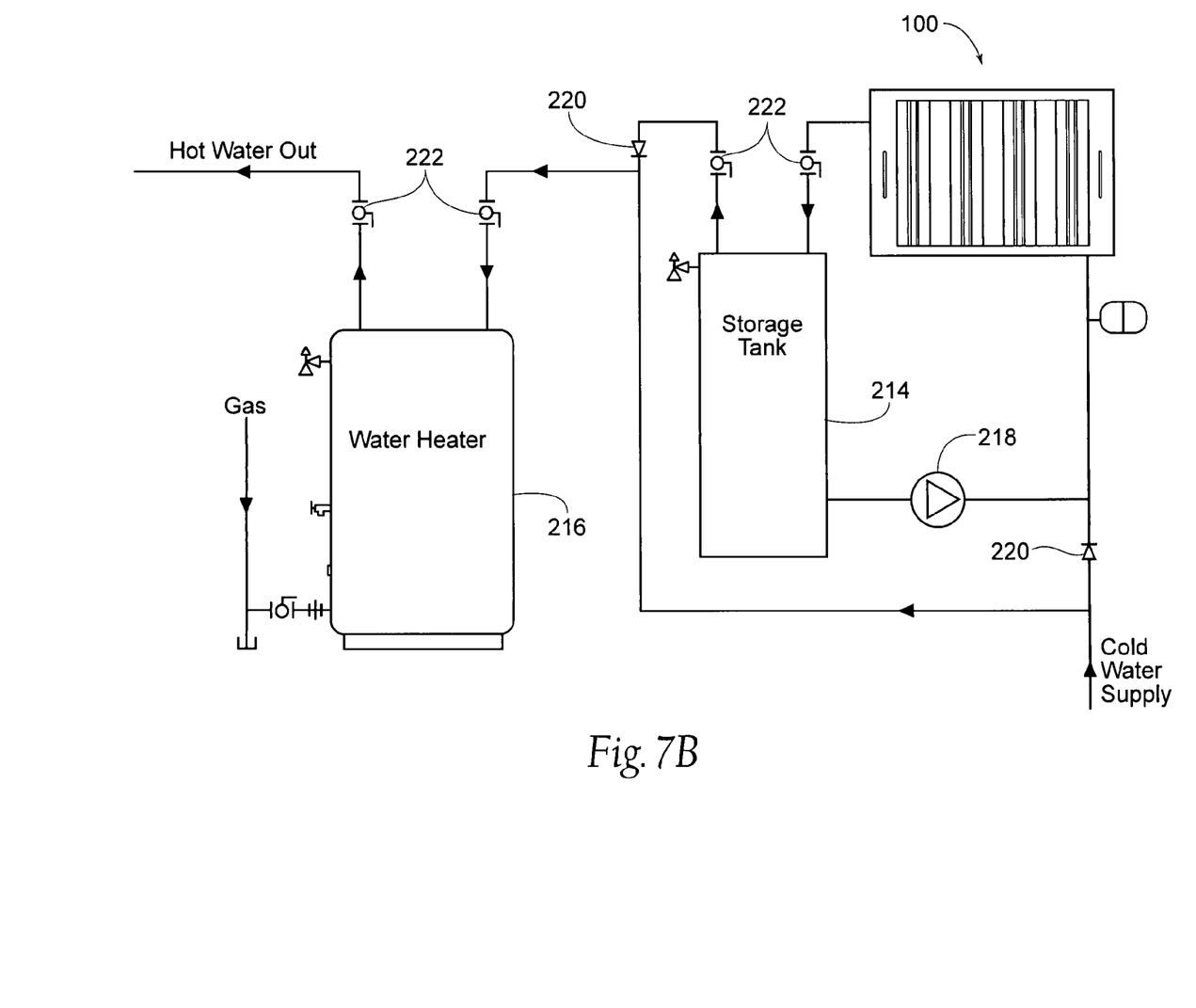
FIG. 7B is a partial cutaway view of a second embodiment of an open system utilizing an embodiment of a filter unit according to the present invention.

An enhanced open system can be seen in FIG. 7B. In addition to the storage tank 214, the enhanced system may include a water heating tank 216 and a recirculating pump 218. The plumbing diagram of FIG. 7B will be readily understood by a person having ordinary skill in the art, as including various check valves 220 and shut-off valves 222 in desired positions. One advantage to this enhanced system is that if fluid usage is not keeping up with the supply of heated fluid, fluid stored in the storage tank 214 may be recirculated to keep it warm in the event of demand increase. The recirculating pump 218 may be selectively activated and deactivated, such as on a time schedule or based upon a measured temperature of the fluid in the storage tank 214 falling below a predetermined threshold.

Figure 8:
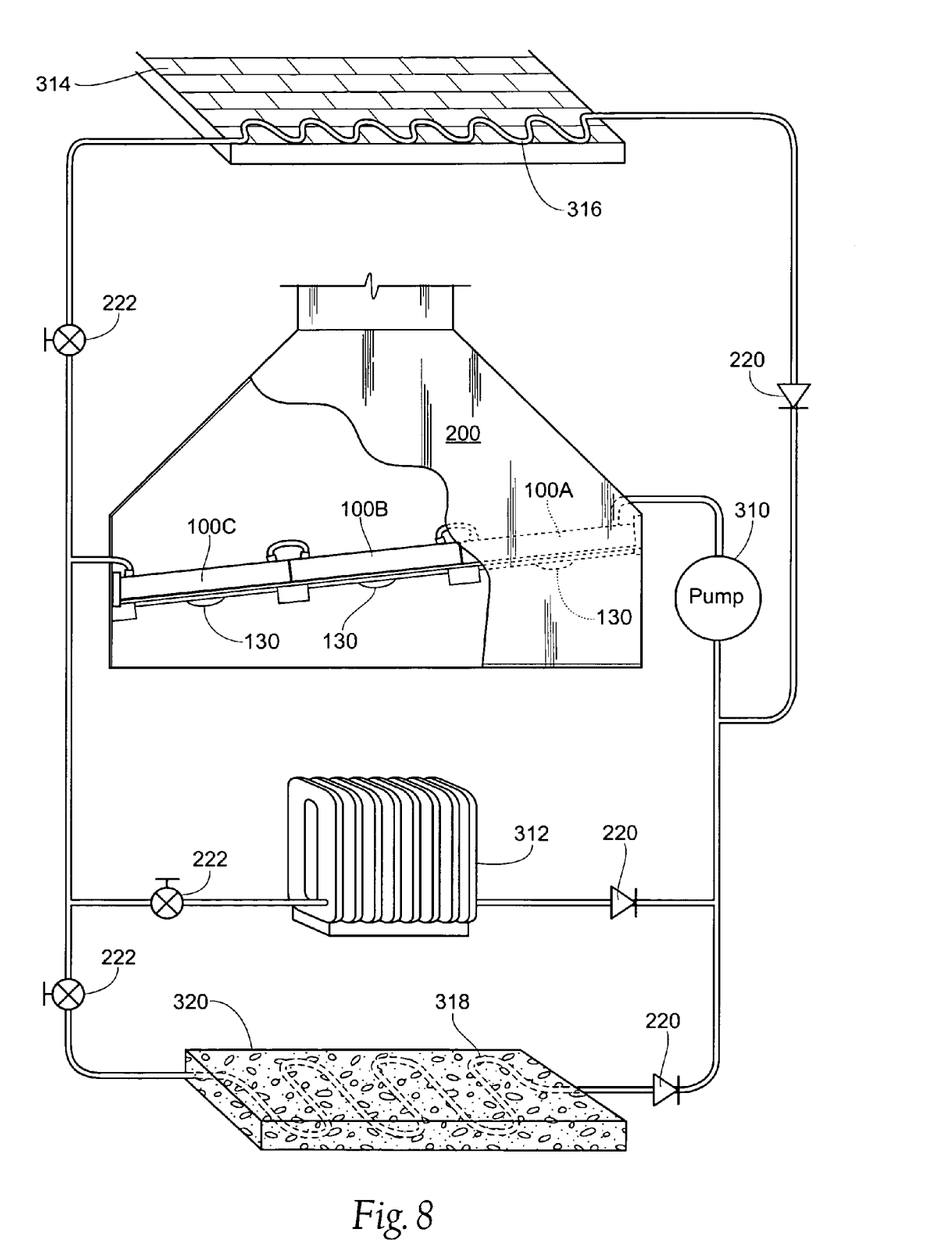
FIG. 8 is a partial cutaway view of a first embodiment of a closed system utilizing an embodiment of a filter unit according to the present invention.

Additionally or alternatively, the system may be a closed system, where the goal may be to transfer the heat from the exhaust gases and put the heat to use elsewhere. An example of a closed system is shown in FIG. 8. In this system, water or other fluid is introduced into the closed system and substantially all of any residual air is purged. The fluid may be pumped through the system by an inline pump 310, through conduit 212 and through one or more filter units 100. After traveling through the one or more filter units 100, in which the fluid was heated by exhaust from the cooking surface 202, the fluid may then be caused to travel through one or more additional heat exchangers. For instance, the fluid may be pumped through a radiator 312 to heat a room. Additionally or alternatively, the fluid may be pumped through a roof heat exchanger 314 disposed along the edge of the roof 316 of the building in which the system is housed, to prevent ice damming. Additionally or alternatively, the fluid may be pumped through a sidewalk heat exchanger 318 disposed beneath or embedded in a concrete or other external walkway 320 to reduce the buildup of ice thereon. It is to be appreciated that the function of a system according to the present invention may be changed depending upon the time of year. For instance, in summer months, it may not be desirable to use a closed system for heating purposes as described. In such situations, the fluid may remain static and the filter units 100 may simply be used to collect oil particulates from the exhaust air. Alternatively, the closed system could be changed to an open system in the summer months, thereby providing hot water for use.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A filter unit comprising:
   a housing including a cavity;
   a heat exchanger disposed substantially within the cavity;
   at least one entrance aperture provided through the housing on an upstream side of the heat exchanger;
   at least one baffle provided on the housing on a downstream side of the heat exchanger, the downstream side being oppositely disposed of the upstream side;
   at least one exit aperture provided through the housing on the downstream side of the heat exchanger;
   wherein the at least one baffle is aligned with the at least one entrance aperture, such that when a gas is drawn through the at least one entrance aperture and across the heat exchanger, the baffle redirects the gas towards the heat exchanger prior to the gas leaving the cavity through the at least one exit aperture;
   wherein the housing comprises a base and a cover;
   wherein the base comprises:
      a substantially planar base wall having a base wall perimeter;
      a plurality of lateral sidewalls coupled to the base wall perimeter, the plurality of lateral side walls substantially encircling the base cavity;
      wherein the at least one entrance aperture is formed through the base wall; and
   wherein the base comprises a pair of fin members extending partially across each entrance aperture into the cavity at an oblique angle relative to the base wall.

2. A filter unit according to claim 1, wherein the cover comprises:
   a substantially planar cover plate having a cover plate perimeter; and
   at least one lateral cover sidewall coupled to and extending at an oblique angle from the cover plate, the at least one lateral cover sidewall adapted to extend into the housing cavity,
   wherein the at least one exit aperture is formed through the cover plate.

3. The filter unit according to claim 1, wherein the heat exchanger comprises:
   a first header pipe extending between a first end and a second end;
   a second header pipe spaced from the first header pipe, the second header pipe extending between a third end and a fourth end;
   at least one fluid flow conduit disposed between and in fluid communication with the first header pipe and the second header pipe, wherein the header pipes and at least one fluid flow conduit define a fluid cavity;
   a first fluid port provided on the first header pipe in fluid communication with the fluid cavity; and a second fluid port provided on the second header pipe in fluid communication with the fluid cavity.

4. The filter unit according to claim 1, wherein at least one of the first end and the second end is closed.

5. The filter unit according to claim 2, wherein both the first end and the second end are closed.

6. The filter unit according to claim 1, wherein at least one of the third end and fourth end is closed.

7. The filter unit according to claim 1, wherein the first and second header pipes are substantially longitudinally straight pipes disposed at least substantially parallel to each other.

8. The filter unit according to claim 7, wherein a plurality of fluid flow conduits are provided at least substantially parallel to each other and at least substantially orthogonal to the header pipes.

9. The filter unit according to claim 1, wherein the heat exchanger comprises a heat-conductive material at least partially coated with a reduced friction material.

10. The filter unit according to claim 9, wherein the reduced friction material is polytetrafluoroethylene.

11. A filter unit according to claim 1, wherein the base wall perimeter is substantially rectilinear.

12. A system comprising:
a cooking surface including a heat source;
an exhaust system adapted to draw in gasses that are disposed above the cooking surface, the exhaust system providing a gas flow path for the gasses;
a filter unit disposed in the gas flow path, the filter unit comprising:
a housing including a cavity;
a first heat exchanger disposed substantially within the cavity, the first heat exchanger including a fluid input port and a fluid output port;
at least one entrance aperture provided through the housing on an upstream side of the first heat exchanger;
at least one baffle provided on the housing on a downstream side of the first heat exchanger, the downstream side being oppositely disposed of the upstream side; and
at least one exit aperture provided through the housing on the downstream side of the first heat exchanger,
wherein the at least one baffle is aligned with the at least one entrance aperture, such that when the gasses are drawn through the at least one entrance aperture and across the first heat exchanger, the baffle redirects the gasses towards the first heat exchanger prior to the gasses leaving the cavity through the at least one exit aperture;
a fluid supply coupled to the input port;
a drain line coupled at a drain upstream end to the output port and at a drain downstream end to one or more of a storage tank and a second heat exchanger.

13. The system according to claim 12, wherein the second heat exchanger is selected from the group consisting of: a radiator adapted to heat an indoor space, a length of heat-conductive tubing disposed in or below a walking surface, and a length of heat-conductive tubing disposed on a roof of a building.

14. The system according to claim 13, wherein the drain line is coupled to the second heat exchanger and a third heat exchanger.

15. The system according to claim 14, wherein each of the second heat exchanger and the third heat exchanger is selected from the group consisting of: a radiator adapted to heat an indoor space, a length of heat-conductive tubing disposed in or below a walking surface, and a length of heat-conductive tubing disposed on a roof of a building.

16. The system according to claim 13, wherein the cooking surface is disposed substantially parallel to horizontal level, the filter unit further comprising a substantially planar base wall arranged at an oblique angle relative to the cooking surface.

17. The system according to claim 16, wherein the angle is from about 10 degrees to about 60 degrees.

18. The system according to claim 17, wherein the angle is from about 12 degrees to about 45 degrees.

* * * * *